US006352806B1

(12) United States Patent
Dalal

(10) Patent No.: US 6,352,806 B1
(45) Date of Patent: Mar. 5, 2002

(54) LOW TONER PILE HEIGHT COLOR IMAGE REPRODUCTION MACHINE

(75) Inventor: Edul N. Dalal, Webster, NY (US)

(73) Assignee: Xerox Corporation, Stamford, CT (US)

(*) Notice: Subject to any disclaimer, the term of this patent is extended or adjusted under 35 U.S.C. 154(b) by 0 days.

(21) Appl. No.: 09/677,616

(22) Filed: Oct. 3, 2000

(51) Int. Cl.[7] .............................................. G03G 13/01
(52) U.S. Cl. ............................ 430/42; 430/44; 430/45; 399/178; 399/184; 399/223; 399/226; 399/302
(58) Field of Search ............................ 430/42, 44, 45; 399/178, 184, 223, 226, 302

(56) References Cited

U.S. PATENT DOCUMENTS 5,999,201 A * 12/1999 Dalal et al. ................. 347/115
6,167,224 A * 12/2000 Dalal .......................... 399/222
6,203,953 B1 * 3/2001 Dalal .......................... 430/47

* cited by examiner

Primary Examiner—Mark Chapman
(74) Attorney, Agent, or Firm—Tallam I. Nguti

(57) ABSTRACT

A low toner pile height color image reproduction machine is disclosed for forming full-gamut toner images approximating a "look and feel" of offset lithographic images. The reproduction machine includes a single moveable endless image bearing member having a path of movement; at least a charging device mounted along the path of movement for uniformly charging a portion of the image bearing member; a controller including an image processor for converting digital image signals into at least seven bitmaps pixels of color separation images including black (K), cyan (C), red (R), magenta (M), blue (B), green (G) and yellow (Y); at least an exposure device mounted along the path of movement for imagewise exposing the portion of the single moving image bearing member to a light pattern of a first one of the at least seven bitmaps to form a first color separation latent image having first image areas and first background areas; and at least a development apparatus mounted along the path of movement for developing the first image areas of the first color separation latent image using toner particles having a color corresponding to that of the first one of the at least seven bitmaps.

11 Claims, 2 Drawing Sheets

LOW TONER PILE HEIGHT COLOR IMAGE REPRODUCTION MACHINE

BACKGROUND OF THE INVENTION

This invention relates generally to dry powder toner xerography, and more particularly to a low toner pile height color electrostatographic reproduction machine for producing high quality color toner images approximating the "look and feel" of lithographically produced color images. In an electrostatographic printing machine, a photoconductive member is charged to a substantially uniform potential to sensitize the surface thereof. The charged portion of the photoconductive member is exposed to a light image of a document being reproduced. Exposure of the charged photoconductive member selectively dissipates the charge thereon in irradiated areas. This records an electrostatic latent image on the photoconductive member corresponding to the informational areas contained within the document being reproduced.

After the electrostatic latent image is recorded on the photoconductive member, the latent image is developed by bringing developer material containing charged toner particles, for example, black toner particles, into contact therewith. Developer material can be single component comprising only of charged toner particles, or it may be dual component comprising carrier particles and toner particles that are triboelectrically charged when admixed or mixed with the carrier particles. In either case, bringing the developer material into contact with the latent image forms a toner image on the photoconductive member which is subsequently transferred to a copy sheet. The copy sheet is then separated from the photoconductive member and the toner powder is fed on the copy sheet through a fusing apparatus where it is heated to permanently affix it to the copy sheet, thus forming a black and white copy or print of the document.

Multi-color electrostatographic printing machines which use multi-colored toners are substantially identical in each color image forming process to the foregoing process of black and white printing which uses only black toner. However, rather than forming a single latent image on the photoconductive surface, several single color latent images corresponding to color separated light images of the original document are recorded thereon. Each single color electrostatic latent image is developed with toner particles of a color complementary thereto. This process may be performed in a single pass, or in multipasses during which image formation is repeated a plurality of cycles for differently colored images using their respective complementarily colored toner particles to form color toner images. Each single color toner powder image is transferred to a copy sheet in superimposed registration with the other toner powder images.

This creates a composite multi-layered toner powder image on the copy sheet. The copy sheet is separated from the photoconductive member and, thereafter, the multi-layered toner powder image on the sheet is fed through a fusing apparatus and permanently affixed to the copy sheet, thus creating a multi-color document. In a black and white or multi-color electrostatographic printing machine, the copy sheet is typically brought into moving contact with the photoconductive member during toner powder image transfer to the copy sheet. A sheet transport apparatus is typically provided for receiving the copy sheet incrementally as it is incrementally separated from the photoconductive member, and for transporting the copy sheet towards and into the fusing apparatus.

High toner pile height is a major document appearance problem for dry powder Xerography. High toner pile height is obvious or noticeable to customers, not only as increased document thickness but also in other undesirable ways, such as paper curl. The problem is compounded by the fact that toner pile height also varies within a page from zero in white areas to a maximum value in very dark toned areas. This leads to further document appearance degradation in terms of ripple (non-uniform curl), and differential gloss, for examples. Such paper distortion problems or defects are important in high quality dry or powder toner applications which are intended to compete in a market that is accustomed to the document "look and feel" of lithography. Similarly, these issues will become even more important for applications which require the apparently more demanding "look and feel" of photography.

In addition to being aesthetic dissatisfiers, paper distortion problems or defects due to curl and ripple undesirably also increase the jam rate of paper handling in the machine, and thus complicate paper handling and document finishing. This is objectionable in any market, but especially in the high speed production color printing market.

There is therefore a need for a low toner pile height color electrostatographic reproduction machine that is suitable for producing high quality color toner images approximating or having the "look and feel" of lithographically produced color images, if powder toner xerography is to become a serious contender in markets where the "look and feel" images is important.

SUMMARY OF THE INVENTION

In accordance with the present invention, there is provided a low toner pile height color image reproduction machine for forming full-gamut toner images approximating a "look and feel" of offset lithographic images. The reproduction machine includes a single moveable endless image bearing member having a path of movement; at least a charging device mounted along the path of movement for uniformly charging a portion of the image bearing member; a controller including an image processor for converting red, green, blue (RGB) digital image signals into at least seven bitmaps pixels of color separation images including black (K), cyan (C), red (R), magenta (M), blue (B), green (G) and yellow (Y); at least an exposure device mounted along the path of movement for imagewise exposing the portion of the single moving image bearing member to a light pattern of a first one of the at least seven bitmaps to form a first color separation latent image having first image areas and first background areas; and at least a development apparatus mounted along the path of movement for developing the first image areas of the first color separation latent image using toner particles having a color corresponding to that of the first one of the at least seven bitmaps.

BRIEF DESCRIPTION OF THE DRAWINGS

In the detailed description of the invention presented below, reference is made to the drawings, in which.

DETAILED DESCRIPTION OF THE INVENTION

While the present invention will be described in connection with a preferred embodiment thereof, it will be understood that it is not intended to limit the invention to that embodiment. On the contrary, it is intended to cover all alternatives, modifications, and equivalents as may be included within the spirit and scope of the invention as defined by the appended claims.

Figure 1:
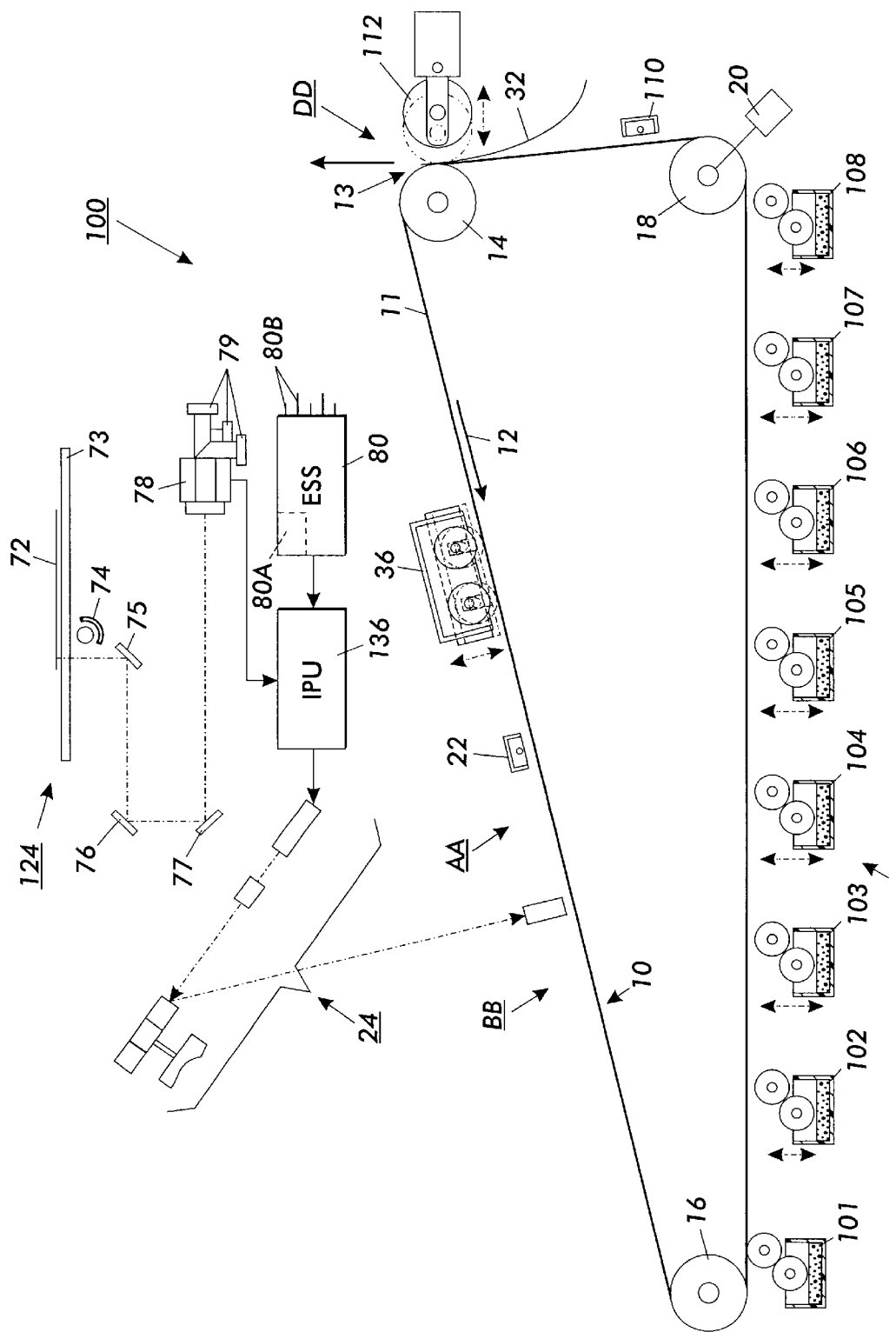
FIG. 1 is a schematic illustration of a multipass, first embodiment of the full-gamut color electrostatographic reproduction in accordance with the present invention.
Figure 2:
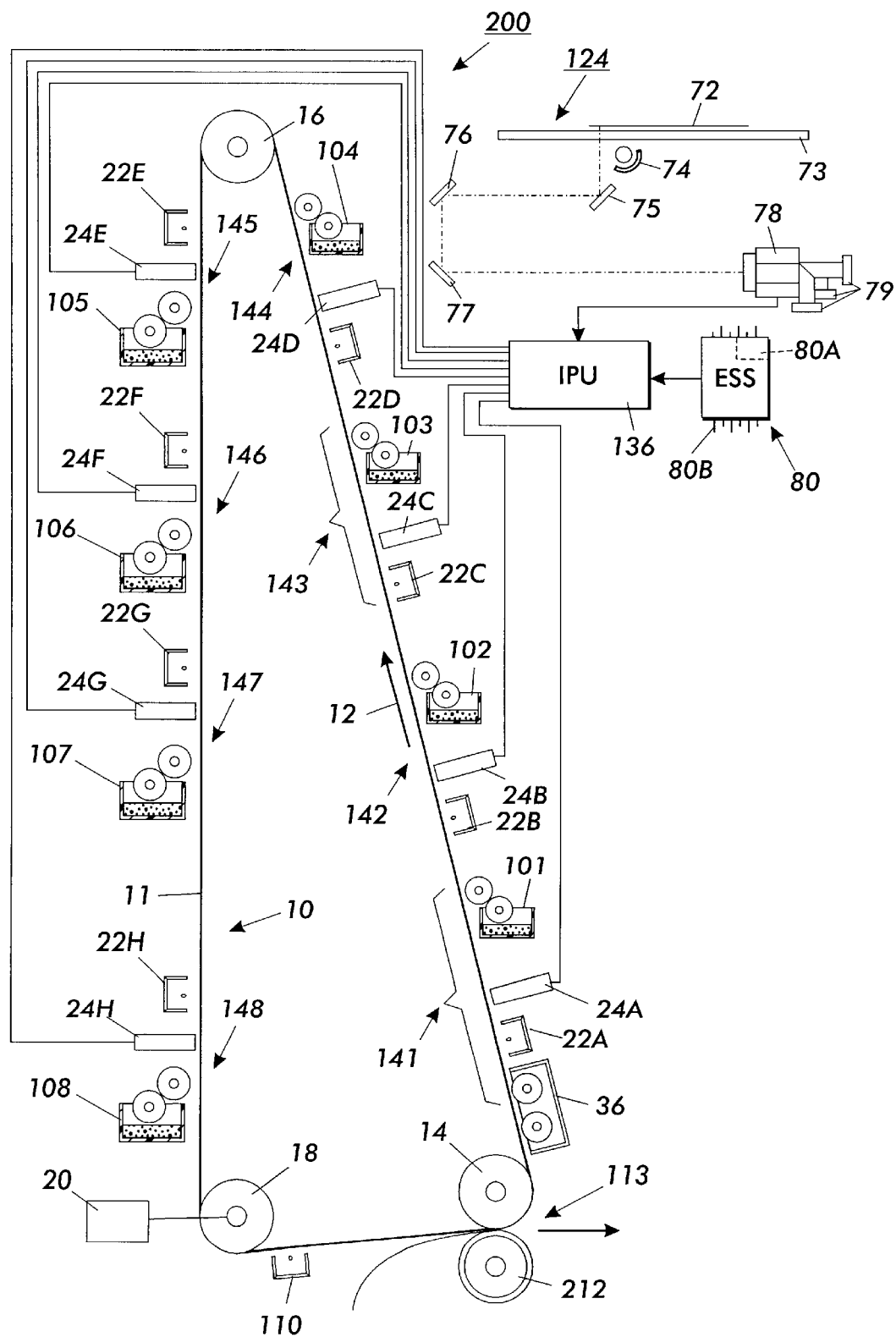
FIG. 2 is a schematic illustration of a single-pass, second embodiment of the full-gamut color electrostatographic reproduction in accordance with the present invention.

Referring to FIGS. 1 and 2, apparatus in the form of a full-gamut color electrostatographic reproduction machine 100, 200 are provided for forming full-gamut toner images approximating a "look and feel" of offset lithographic images.

Commonly assigned, U.S. application Ser. No. 09/437, 117 now U.S. Pat. No. 6,203,953 discloses a similar method and apparatus for forming a seven-color CMYKRGB or eight-color CMYKRGBW image having reduced toner pile height than in conventional four-color xerography, resulting in more uniform image gloss. The method disclosed includes the significantly different steps of: forming first spot next to spot toner images by placing spots of toner of a first color next to spots of toner of a second color on a first photoconductive member; forming second spot next to spot toner images by placing spots of toner of a third color next to spots of toner of a fourth color on a second photoconductive member, and transferring said first and second spot next to spot images to form a composite spot next to spot image on an intermediate imaging member. The disclosure in addition teaches background, and relevant portions of it are herein incorporated by reference.

Still referring to FIGS. 1 and 2, the full-gamut color electrostatographic reproduction machines 100, 200 each include a single moveable endless image bearing member 10 that has a path of movement as shown, and at least one charging device 22, mounted along the path of movement for uniformly charging a portion of the image bearing member.

The full-gamut color electrostatographic reproduction machines 100, 200 each also includes an electronic control subsystem (ESS) or controller 80 that has an image processor 136 for converting red, green, blue (RGB) digital image signals into at least seven bitmaps pixels of color separation images comprising black (K), cyan (C), red (R), magenta (M), blue (B), green (G) and yellow (Y). In addition, the full-gamut color electrostatographic reproduction 100, 200 each includes at least an exposure device 24 that is also mounted along the path of movement for imagewise exposing the portion of the single moving image bearing member 10 to a light pattern of a first one of the at least seven bitmaps to form a first color separation latent image having first image areas and first background areas. A plurality of development units 101, 102, 103, 104, 105, 106, 107, 108, are provided and include a first development unit 101 that is mounted along the path of movement for developing the first image areas of the first color separation latent image using toner particles having a color corresponding to that of the first one of the at least seven bitmaps of color separation images.

In both embodiments 100, 200, the development units 101, 102, 103, 104, 105, 106, 107, 108, of the plurality of development units 101, 102, 103, 104, 105, 106, 107, 108 are spaced apart along the path of movement. Alternatively, an eighth development unit 108 containing clear colorless developer material may also be included for forming an eighth color separation toner image using clear colorless toner particles, thereby resulting in a uniform gloss of the final full-gamut multicolor toner image produced by the machine 100, 200 of the present invention.

In the multi-pass embodiment 100, (FIG. 1) of the full-gamut color electrostatographic reproduction, each development unit 101 of the plurality of development units is selectively moveable into and out of a development position along the path of movement, and the first, second, third, fourth, fifth, sixth and at least seventh color separation toner images are each formed, one per revolution of the moveable endless image bearing member 10.

In the single pass embodiment 200, (FIG. 2) of the full-gamut color electrostatographic reproduction, a plurality of charging devices 22A, 22B, 22C, 22D, 22E, 22F, 22G, 22H is provided. The charging devices 22A, 22B, 22C, 22D, 22E, 22F, 22G, 22H, are mounted spaced apart along the path of movement. This along with exposure and development devices thus enables the machine 100, 200 to form first, second, third, fourth, fifth, sixth and at least seventh color separation toner images during one revolution of the moveable endless image bearing member.

Thus, the method of the present invention for forming full-gamut toner images approximating or having a "look and feel" of offset lithographic images includes the steps of converting red, green, blue (RGB) digital image signals into at least seven bitmaps pixels of color separation images comprising black (K), cyan (C), red (R), magenta (M), blue (B), green (G) and yellow (Y); uniformly charging an image frame portion of a single moving image bearing member 10 using a charging device; imagewise exposing the portion of the single moving image bearing member 10 to a light pattern of a first one of the at least seven bitmaps to form a first color separation latent image having first image areas and first background areas; and forming a first color separation toner image by developing the first image areas of the first color separation latent image using toner particles having a color corresponding to that of the first one of the at least seven bitmaps.

The method of the present invention further includes the steps of uniformly recharging the image frame portion containing the first color separation toner image (that is, toner in the first image areas, and no toner in the first background areas); imagewise re-exposing the first background areas of the recharged image frame portion to a light pattern of a second one of the at least seven bitmaps of pixels of color separation images so as to form a second color separation latent image having second image areas and second background areas; forming a second toner separation image in registration with the first toner separation image by developing the second image areas of the second color separation latent image using toner particles having a color corresponding to that of the second one of the at least seven bitmaps.

For each of the remaining ones of the at least seven bitmaps of color separation images, the method of the present invention then involves repeating the steps of recharging, re-exposing, and developing to form a toner image (in the image frame portion) of such each of the at least seven bitmaps of color separation images. The result is a full-gamut KCRMBGY multicolor toner image that has a relatively high level of image-next-to-image registration as well as relatively low toner pile height, which thus appears to have a "look and feel" of offset lithographic images.

Additionally, in accordance with the method of the present invention, for each of the at least seven bitmaps or bitmap images, a number of pixels forming a periphery of image areas is variable so as to enable improved image-next-image (INI) registration. Given such variability in the number of periphery pixels of a bitmap image being exposed, in each step of re-exposing recharged background areas, edges of preceding developed color separation toner images (adjoining such a bitmap image being exposed) actually limit and control the number of periphery pixels of the bitmap image being exposed. As such, the number of pixels can expand or increase to fill in what would otherwise be a gap in registration, or the number can contract in order to avoid toner image overlapping or image-on-image build (as opposed to INI registration).

According to another aspect of the present invention, the development units and the controller are arranged such that in forming the at least seven color separation toner images, each subsequent color separation latent image is developed using toner particles having a higher laser-blocking level than toner particles used to develop preceding color separation latent images.

Referring specifically to FIG. 1, there is depicted a multipass, first embodiment of the full-gamut color electrostatographic reproduction machine 100 of the present invention. As is well known, the color electrostatographic reproduction process typically involves a computer generated color image which may be conveyed to an image processor 136, or alternatively a color document 72 which may be placed on the surface of a transparent platen 73. A scanning assembly 124, having a light source 74 illuminates the color document 72. The light reflected from document 72 is reflected by mirrors 75, 76, and 77, through lenses (not shown) and a dichroic prism 78 to three charged-coupled linear photosensing devices (CCDs) 79 where the information is read.

Each CCD 79 outputs a digital image signal the level of which is proportional to the intensity of the incident light. The digital signals represent each pixel and are indicative of blue, green, and red densities. The blue, green, and red digital signals are conveyed to an Image Processing Unit (IPU) 136 where under the control of an electronic subsystem (ESS) 80, and in accordance with the present invention, they are converted into at least seven color separations and corresponding color separation bit map images comprising black (K), cyan (C), red (R), magenta (M), blue (B), green (G) and yellow (Y). The IPU 136 stores the bit map images for further instructions and use from the ESS 80.

As illustrated, the ESS 80 is preferably a self-contained, dedicated mini-computer having a central processor unit (CPU), electronic storage, and a display or user interface (UI). The ESS 80 is thus the control system which (with the help of sensors and connections such as 80B as well as a calculator 80A), reads, captures, prepares and manages the image data flow between IPU 136 and image input terminal 124. In addition, the ESS 80 is the main multi-tasking processor for operating and controlling all of the other machine subsystems and printing operations, including the Image Next to Image (INI) imaging and development in accordance with the present invention.

The multipass color electrostatographic reproduction machine 100 employs a single moveable endless image bearing member, shown in the form of a belt 10 having a photoconductive surface layer 11. Preferably the surface 11 is made from an organic photoconductive material, although numerous photoconductive surfaces and conductive substrates may be employed. As shown, the belt is entrained about a drive roller 18 and two tension rollers 16 and 14. Drive roller 18 is operatively connected to a drive motor 20 for effecting movement of the belt through a series of xerographic image forming stations.

With continued reference to FIG. 1, in a first pass of the multi-pass embodiment of the machine 100, an image frame portion of belt 10 first passes through a charging station AA where a corona generating device, indicated generally by the reference numeral 22, charges the photoconductive surface of belt 10 to a relatively high, and substantially uniform potential. For purposes of example, the image frame portion of the image bearing member is negatively charged, however it is understood that the present invention could be useful with a positively charged image bearing member, by correspondingly varying the charge levels and polarities of the toners, recharge devices, and other relevant regions or devices involved in the image-next-image (INI) color image formation process, as will be hereinafter described.

In its first pass, the charged image frame portion (of photoconductive surface 11) of belt 10 is next advanced through an imaging station BB. At imaging station BB, the uniformly charged belt 10 is exposed to a laser based output scanning device or raster output scanner (ROS device) 24 that is coupled to the IPU 136. The ROS device 24 thus exposes the image frame portion of the single moving image bearing member to a light pattern of a first one of the at least seven bitmap images to form a first color separation latent image having first image areas and first background areas. Preferably the scanning device is a laser Raster Output Scanner (ROS). Alternatively, the ROS could be replaced by other exposure devices. After exposure, an electrostatic latent image of the first one of the at least seven color separation bitmap images is recorded on image frame portion of the photoconductive surface.

As illustrated, the charged image frame portion of belt 10 (carrying the first image areas and first background areas of the first color separation latent image) is next advanced, in this first pass of the image frame portion, to a development region shown generally as CC. Within the development region CC, a plurality of development units 101, 102, 103, 104, 105, 106, 107, 108, are provided, mounted along the path of movement, and include a first development unit 101. The first development unit 101 is suitable for developing the first image areas of the first color separation latent image into a first color separation toner image by using toner particles having a color corresponding to that of the first one of the at least seven bitmaps of color separation images.

In this multi-pass, first embodiment 100 of the machine 100, the development units 101, 102, 103, 104, 105, 106, 107, 108 are mounted spaced apart along the path of movement, and are each selectively moveable out of, and into, a developing position against the surface 11 of belt 10. As such, for developing the first image areas of the first color separation latent image into a first color separation toner image in the first pass of the image frame portion, only development unit 101 is selectively moved into a developing position against the surface 11, while the others (development units 102, 103, 104, 105, 106, 107, 108) are each selectively moved out of a developing position with the surface 11. Thus during this first pass of the image frame portion, a first color separation toner image is thus formed within the image frame portion, having toner particles only in its first image areas, and no toner in its first background areas.

As further shown, the machine 100 includes a transfer station DD for example, where a fully formed full-gamut multicolor toner image (formed after a desired number of passes of the image frame portion and from a desired number of color separation toner images) can be transferred onto a copy sheet 32 that is controllably fed into a transfer nip 110. The transfer nip 110, as shown, is formed by a roller 112 that (like the development units) is selectively moveable out of, and into, a toner image transfer position against the surface 11 of belt 10.

Thus to form a full-gamut multicolor toner image requiring at least seven color separation toner images in accordance with the present invention, the roller 112 must stay out of its toner image transfer position with the surface 11 for at least six passes of the image frame portion while the color separation toner images of KCRMBGY are being formed. Then following the at least seventh pass of the image frame portion through the stations AA, BB and development region CC, during which the seventh color separation toner image is formed in the INI manner of the present invention, the roller 112 is controllably set in its toner image transfer position, and the fully formed full-gamut multicolor toner image can then be transferred onto a copy sheet 32 that is controllably fed into the transfer nip 110, and then fixed. Alternatively the image can be transferred to an intermediate member and then transferred or transfixed to the copy paper.

The machine 100 as shown also includes a cleaning device 36 that is also selectively moveable out of, and into, cleaning engagement with the surface 11 of belt 10. Like the roller 112, the cleaning device 36 must therefore stay out of its cleaning engagement with surface 11 of belt 10, while the color separation toner images of KCRMBGY are being formed on the image frame portion. The cleaning device 36 thus can be brought into its cleaning engagement with surface 11 of belt 10 only after the fully formed full-gamut multicolor toner image has been transferred onto a copy sheet 32.

Thus, with the roller 112 out of nip formation with the surface 11, and the cleaning device 36 out of its cleaning engagement with surface 11, the first color separation toner image, as formed during a first pass of the image frame portion, will stay on the image frame portion back to the charging station AA to start a second pass through stations AA, BB, and development region CC.

As described above, during such second pass, and each similar subsequent pass, (third, fourth, fifth, sixth and at least seventh), the remaining untoned background areas and the toner image areas of the preceding color separation images on the image frame portion are recharged, the recharged remaining background areas are re-exposed in registration with a light pattern of the appropriate bitmap image of the at least seven bitmap images to form its latent image, and such latent image is developed with the appropriate color toner particles, thereby building up a full-gamut multicolor toner image that will then be transfixed as above onto a copy sheet 32.

Referring specifically to FIG. 2, there is depicted a single pass, second embodiment of the full-gamut color electrostatographic reproduction machine of the present invention, shown generally as 200. As is well known, the color electrostatographic reproduction process typically involves a computer generated color image which may be conveyed to an image processor 136, or alternatively a color document 72 which may be placed on the surface of a transparent platen 73. A scanning assembly 124, having a light source 74 illuminates the color document 72. The light reflected from document 72 is reflected by mirrors 75, 76, and 77, through lenses (not shown) and a dichroic prism 78 to three charged-coupled linear photosensing devices (CCDs) 79 where the information is read.

Each CCD 79 outputs a digital image signal the level of which is proportional to the intensity of the incident light. The digital signals represent each pixel and are indicative of blue, green, and red densities. The blue, green, and red digital signals are conveyed to an Image Processing Unit (IPU) 136 where under the control of an electronic subsystem (ESS) 80, and in accordance with the present invention, they are converted into at least seven color separations and corresponding color separation bit map images comprising black (K), cyan (C), red (R), magenta (M), blue (B), green (G) and yellow (Y). The IPU 136 stores the bit map images for further instructions and use from the ESS 80.

As illustrated, the ESS 80 is preferably a self-contained, dedicated mini-computer having a central processor unit (CPU), electronic storage, and a display or user interface (UI). The ESS 80 is thus the control system which (with the help of sensors and connections such as 80B as well as a calculator 80A), reads, captures, prepares and manages the image data flow between IPU 136 and image input terminal 124. In addition, the ESS 80 is the main multi-tasking processor for operating and controlling all of the other machine subsystems and printing operations, including the Image Next to Image (INI) imaging and development in accordance with the present invention.

The single pass color electrostatographic reproduction machine 200 employs a single moveable endless image bearing member, shown in the form of a belt 10 having a photoconductive surface layer 11. Preferably the surface 11 is made from an organic photoconductive material, although numerous photoconductive surfaces and conductive substrates may be employed. As shown, the belt is entrained about a drive roller 18 and two tension rollers 16 and 14. Drive roller 18 is operatively connected to a drive motor 20 for effecting movement of the belt through a series of xerographic image forming stations.

With continued reference to FIG. 2, single pass embodiment or machine 200 includes at least seven sets 141, 142, 143, 144, 145, 146, 147 of imaging devices mounted along the path of movement, wherein each set comprises a charging device 22A, 22B, 22C, 22D, 22E, 22F, 22G an exposing device 24A, 24B, 24C, 24D, 24E, 24F, 24G and a development unit 101, 102, 103, 104, 105, 106, 107. Alternatively, an eighth set 148 of imaging devices comprising a charging device 22H, an exposing device 24H, and a development unit 108 containing clear colorless developer material, may also be included for forming an eighth color separation toner image using clear colorless toner particles. As pointed out above, the eighth clear colorless toner image produces uniform gloss in the final full-gamut multicolor toner image produced by the machine 200 of the present invention.

In the single pass embodiment of the full-gamut color electrostatographic reproduction 200 (FIG. 2), each development unit 101, 102, 103, 104, 105, 106, 107, 108 of the plurality of development units is mounted operatively in a development position along the path of movement, ready for forming the first, second, third, fourth, fifth, sixth and at least seventh color separation toner images all in one revolution or pass of their image frame portion on the moveable endless image bearing member 10.

Thus, in this single pass embodiment (FIG. 2) an image frame portion of belt 10 on which all at least seven color separation toner images will be formed, first passes under a charging or corona generating device 22A of the first set 141 of imaging devices. The charging device 22A charges the image frame portion of the photoconductive surface 11 to a relatively high, and substantially uniform potential. For purposes of example, the image frame portion of the image bearing member is negatively charged, however it is understood that the present invention could be useful with a positively charged image bearing member, by correspondingly varying the charge levels and polarities of the toners, recharge devices, and other relevant regions or devices involved in the image-next-image (INI) color image formation process, as will be hereinafter described.

The uniformly charged image frame portion (of photoconductive surface 11) is next advanced under an imaging or exposing device 24A which is preferably a laser based output scanning device or raster output scanner (ROS device). As shown, the ROS device 24A and the rest of such exposing devices 24B, 24C, 24D, 24E, 24F, 24G, 24H, are coupled to the IPU 136. The ROS device 24A of the first set 141 of imaging devices exposes the image frame portion of the single moving image bearing member to a light pattern of a first one of the at least seven bitmap images thus forming a first color separation latent image having first image areas and first background areas. Alternatively, the ROS could be replaced by other exposure devices.

As illustrated, the image frame portion of belt 10 (now carrying the first image areas and first background areas of the first color separation latent image) is next advanced to the first development unit 101. The first development unit 101 includes an appropriate color developer material containing toner particles that are suitable for developing the first image areas of the first color separation latent image into a first color separation toner image. The first background areas of the first color separation latent image are of course not developed. The toner particles of course have a color corresponding to that of the first one of the at least seven bitmaps of color separation images.

As illustrated, the image frame portion of belt 10 (now carrying thereon the first color separation toner image consisting of toner particles in the first image areas thereof, and no toner particles in the first background areas) is next advanced to the second set 142 of imaging devices. As above, the second set 142 comprises a charging device 22B, an exposing device 24B, and a development unit 102, for charging, exposing and developing the advanced image frame portion, thus similarly forming (in registration with the first color separation toner image), a second color separation toner image on the image frame portion.

Similarly, as shown, the image frame portion of belt 10 (now carrying thereon the cumulation of the preceding color separation toner images consisting of toner particles in developed image areas thereof, and no toner particles in ever decreasing background areas) is then advanced to the third, the fourth, the fifth, the sixth and the at least seventh, set 143, 144, 145, 146 and 147, of imaging devices. As in the case of the second set 142, each of the other sets comprises a charging device 22C, 22D, 22E, 22F, 22G, an exposing device 24C, 24D, 24E, 22F, 22G, and a development unit 103, 104, 105, 106, 107, for charging, exposing and developing the advanced image frame portion, thus similarly forming, if necessary, (in registration with the preceding color separation toner images), a subsequent color separation toner image on the image frame portion.

Thus, in this manner, a full-gamut multicolor toner image requiring at least seven color separation toner images in accordance with the present invention can be formed from color separation toner images of KCRMBGY, on the advancing image frame portion by the time the image frame portion is advanced passed the seventh set 148 of imaging devices 22g, 24G and 107.

Alternatively, an eighth set 148 of imaging devices is provided, and comprises a charging device 22H, an exposing device 24H, and a development unit 108. The development unit 108 contains clear colorless developer material for forming an eighth color separation toner image using clear colorless toner particles therefrom, thereby resulting in a uniform gloss of the final full-gamut multicolor toner image produced by the machine 200 of the present invention.

The image frame portion now carrying thereon a fully formed full-gamut multicolor toner image, that may or may not be glossed, is advanced passed a transfer charger 110, and into a transfer nip 113. As shown, the transfer nip 113 is formed by a roller 212, with the surface 11 moving over the belt training roller 14. Within the transfer nip 113, the fully formed full-gamut multicolor toner image (formed from a desired number of color separation toner images on the image frame portion) can be transferred onto a copy sheet 32 that is controllably fed into the transfer nip 113. The transfer nip 110, as shown, is formed by a roller 112. Alternatively the image can be transferred to an intermediate member and then transferred or transfixed to the copy paper.

The machine 200 as shown also includes a cleaning device 36 that is mounted into cleaning engagement with the surface 11 of belt 10. The cleaning device 36 thus can remove residual toner left on the surface 11 after the fully formed full-gamut multicolor toner image has been transfixed onto the copy sheet 32.

In each of the embodiments 100, 200 of the machine of the present invention, the seven development units 101, 102, 103, 104, 105, 106, 107, each contain a different primary color KCRMBGY of toner particles for developing an appropriate color separation latent image in an image-next-to-image (INI) manner. The result is an extremely and relatively very high quality full-gamut multicolor toner image having low toner pile height. The toner particles, preferably dry or powder toner particles, should each be preferably about 7 $\mu$m in diameter or less. Such a size of toner particles when used in an INI manner, with no more than a monolayer any where in the image areas, results in a pile height that is comparable to that of full gamut color images produced with offset lithography.

The additional optional eighth development unit 108 containing clear colorless toner produces extremely uniform image gloss, and enhances the desired "look and feel" of lithographic images. It has been found that the 7 um toner when used in an INI manner, has an image pile height of about 4 um. This is very good given the fact that conventional multicolor total image pile height (from dry or powder toner Xerography, with overlapping toner layers in certain areas of the image) is in the range of 15 um or more. Therefore, the 4 um image pile height of single or monolayer color images formed in accordance with the present invention is significantly less than that of conventional xerography, and by far more favorably comparable to a total image pile height of lithographically produced color images.

Thus in accordance with the present invention, each embodiment of the machine 100, 200 has greater than 6 development units, and the color separation latent and toner images are formed and built up directly on an image bearing member or photoreceptor 10. The first embodiment 100 as illustrated in FIG. 1 is a multi-pass system, while the second embodiment 200 as illustrated in FIG. 2 is a single-pass system and utilizes multiple charging and exposure units in addition to the multiple development units. The multiple charging and exposure units that are required in the second embodiment of FIG. 2 may be justified by the 7 times (or 8 times) speed increase thereof relative to the speed of the multi-pass first embodiment 100.

The reason for building the toner images directly on the photoreceptor rather than on an intermediate belt is that it is much easier to hold good registration between the various color separation images on a photoreceptor. When all seven (or eight) color separation images have been built up directly on the photoreceptor, the entire composite low pile multicolor image is then transferred, either directly to paper as shown or to an intermediate transfer member (not shown). In the latter case, transfix may be utilized, leading to improvements in gloss uniformity and range of substrates.

Although the color separation images are built up on the photoreceptor similarly to how they are in an image-on-image (IOI) machine, there is no intentional overlapping of any toners or portions of such color separation images. This is a very significant and distinguishing difference. Since there is no such overlapping, there is therefore no requirement for the toners to be transparent to the ROS laser wavelength, and so optimum lasers and photoreceptors may be used. As such, an infrared ROS and special photoreceptors are not necessary.

Additionally and importantly, there are no traditional IOI problems such as Overlap Efficiency or Under Color Splatter. Since there are no overlapping toners, there is also no need to provide additional screen angles for halftone screens of the additional colors (R,G,B). In fact, a single screen angle can be used for the entire image.

Good registration and even better performance can be obtained in accordance with the present invention, by building the final, entire composite low pile multicolor image on the single image bearing member or photoreceptor. This is achieved, as described above, by slightly overfilling subsequent exposures and by allowing the edges of previously laid down toner layers or images to define the exposure pattern of the next latent image being formed. In this manner, essentially perfect butting of the different color separation images can be attained, thereby preventing any paper undesirably showing through in the darker color image areas. When this feature is utilized, it is preferable to develop the laser-blocking toners (black and cyan) first.

For very high quality applications, such as photofinishing applications, it is desirable that there be no differential gloss in the final image. Although significantly reduced in the monolayer mode due to uniform toner pile height in all toned areas, differential gloss is not entirely eliminated because there will be toned areas having toner gloss, and untoned white or bare paper areas. Such differential gloss however can be completely eliminated if the white or bare paper areas are filled in with clear (or white) toner in an eight development unit color process.

In any case, the result of adding the white separation and eighth development station and unit, is perfectly uniform toner pile height and gloss everywhere in the final image, thus resulting in total elimination of differential gloss. Moreover, in a duplex application, low and uniform toner pile height on both sides of the page can completely eliminate paper curl and ripple.

When the eight development station color (including clear toner) process described above is utilized, it is not necessary to use the clear toner in all images. Thus, one might use 7 colors for certain images (such as text) but 8 colors for others (such as pictorials).

As can be seen, there has been provided a low toner pile height color image reproduction machine for forming full-gamut toner images approximating or having a "look and feel" of offset lithographic images. The reproduction machine includes a single moveable endless image bearing member having a path of movement; at least a charging device mounted along the path of movement for uniformly charging a portion of the image bearing member; a controller including an image processor for converting red, green, blue (RGB) digital image signals into at least seven bitmaps pixels of color separation images including black (K), cyan (C), red (R), magenta (M), blue (B), green (G) and yellow (Y); at least an exposure device mounted along the path of movement for imagewise exposing the portion of the single moving image bearing member to a light pattern of a first one of the at least seven bitmaps to form a first color separation latent image having first image areas and first background areas; and at least a development apparatus mounted along the path of movement for developing the first image areas of the first color separation latent image using toner particles having a color corresponding to that of the first one of the at least seven bitmaps.

While the embodiment of the present invention disclosed herein is preferred, it will be appreciated from this teaching that various alternatives, modifications, variations or improvements therein may be made by those skilled in the art, which are intended to be encompassed by the following claims:

What is claimed is:

1. A method of forming full-gamut toner images having low toner pile height approximating the "look and feel" of offset lithographic images, the method comprising:

(a) converting digital image signals into at least seven bitmap pixels of color separation images comprising black (K), cyan (C), red (R), magenta (M), blue (B), green (G) and yellow (Y);

(b) uniformly charging a portion of a single moving image bearing member;

(c) imagewise exposing the portion of the single moving image bearing member to a light pattern of a first one of the at least seven bitmaps to form a first color separation latent image having first image areas and first background areas;

(d) developing the first image areas of the first color separation latent image using toner particles having a color corresponding to that of the first one of the at least seven bitmaps;

(e) uniformly recharging the first image areas and first background areas in the first position of the single moving image bearing member;

(f) imagewise exposing the recharged first background areas to a light pattern of a second one of the at least seven bitmaps of pixels of color separation images to form a second color separation latent image having second image areas and second background areas;

(g) developing the second image areas of the second color separation latent image using toner particles having a color corresponding to that of the second one of the at least seven bitmaps;

(h) repeating steps (e) to (g) in an increasing order for each of the rest of the at least seven bitmaps; and (i) repeating the steps (e) to (g) for the third, fourth, fifth, sixth and at least seventh ones of the at least seven bitmaps, thereby resulting in a full-gamut KCRMBGY toner image that has a relatively high level of image-next-to-image registration and low toner pile height, and thus approximates the "look and feel" of a lithographically produced color image.

2. The method of claim 1, wherein image areas defined by pixels forming a periphery of each of the at least seven bitmaps are variable.

3. The method of claim 2, wherein in each re-exposure step, edges of preceding toner developed color separation images, adjoining image areas being re-exposed, limit and control each direction in which the adjoining image areas being exposed are variable, thereby resulting in no different color toner overlap and in relative high image-next-to-image registration.

4. The method of claim 3, wherein the at least seven color separation latent images are formed and developed such that a color separation latent image preceding another is appropriately developed using toner particles having a higher laser-blocking level than toner particles used to develop the another.

5. Apparatus for forming full-gamut toner images having a low toner pile height approximating the "look and feel" of offset lithographic images, the apparatus comprising:

(a) a single moveable endless image bearing member having a path of movement;

(b) charging means mounted along said path of movement for uniformly charging a portion of said image bearing member;

(c) a controller including image processing means for converting red, green, blue (RGB) digital image signals into at least seven bitmaps pixels of color separation images comprising black (K), cyan (C), red (R), magenta (M), blue (B), green (G) and yellow (Y);

(d) exposure means mounted along said path of movement for imagewise exposing the portion of the single moving image bearing member to a light pattern of first, second, third, fourth, fifth, sixth and at least seventh to form image-next-to-image color separation latent images thereof each having image areas and background areas; and (e) development means mounted along said path of movement for developing said image areas of each of said first, second, third, fourth, fifth, sixth and at least seventh color separation latent images using toner particles having a corresponding color, thus forming a high quality full-gamut color toner image having a low toner pile height approximating the "look and feel" of a lithographically produced color image;

(f) transfer means for transferring the full-gamut color toner image onto an image receiving substrate.

6. The apparatus of claim 5, wherein said charging means comprises a plurality of changing devices spaced apart along said path of movement.

7. The apparatus of claim 5, wherein said development means comprises a plurality of development units spaced apart along said path of movement.

8. The apparatus of claim 7, wherein said first, second, third, fourth, fifth, sixth and at least seventh color separation toner image is formed during one revolution of said moveable endless image bearing member.

9. The apparatus of claim 7, wherein each development unit of said plurality of development unit is selectively moveable into and out of a development position along said path of movement and said first, second, third, fourth, fifth, sixth and at least seventh color separation toner images are formed one per revolution of said moveable endless image bearing member.

10. The apparatus of claim 9, including transfix means for transferring and fusing the full-gamut color toner image onto a copy sheet.

11. The apparatus of claim 10, including means for forming an eighth color separation toner image using clear colorless toner particles, thereby resulting in a uniform gloss of the full-gamut color toner image.

* * * * *